2,784,136
POLYMERIC INSECTICIDAL COMPOSITIONS AND METHOD FOR DESTROYING INSECTS

Gerarda Francisca Elisa Maria Dierick, Christiaan Pieter van Dijk, and Franciscus Johannes Fredericus van der Plas, Amsterdam, Netherlands, assignors to Shell Development Company, Emeryville, Calif., a corporation of Delaware No Drawing. Application February 17, 1953, Serial No. 337,428

Claims priority, application Germany April 30, 1952

12 Claims. (Cl. 167—22)

This invention relates to insecticidal compositions, and also is concerned with a method for destroying noxious organisms, such as insects, especially in their egg stage.

In order to effectively combat harmful arthropods, for example, insects, spiders and especially mites, such as the so-called red spiders, and in order to obtain the desired protection, it is generally necessary that the activity of the insecticide employed extend to the egg stage. Thus, in the case of rapidly multiplying animal pests, it is necessary to kill a large percentage of the eggs so that not more than approximately 3% remain alive. Heretofore, various types of mineral oils have been employed as ovicides. However, it is usually necessary to employ a relatively high concentration of mineral oil in order to obtain adequate protection, and at high concentrations, there is the danger that the plants themselves will be damaged.

It is, therefore, a principal object of the present invention to provide improved compositions for destroying insects, particularly in the egg stage, which compositions show substantially no phytotoxicity when applied to plants in concentrations sufficiently high to destroy insects and/or their eggs. Another object of this invention is to describe a new method for destroying insects. Other objects and advantages will become apparent from the following detailed description.

In accordance with the present invention, it has now been found that liquid polymers of ethylenically unsaturated hydrocarbons having not more than about 20 carbon atoms per molecule are particularly effective for combatting insects, especially in the egg stage. It is to be understood that the term "polymer" includes both homopolymers and copolymers. It is preferred to employ a liquid polymer which is the product of polymerization of a polymerizable composition comprising at least about 80% by weight of a terminally ethylenically unsaturated hydrocarbon, especially an alkene, having from about 6 to about 15 carbon atoms per molecule.

According to a specific embodiment of the invention, a liquid copolymer which is the product of polymerization of a polymerizable composition comprising an ethylenically unsaturated hydrocarbon having not more than about 20 carbon atoms per molecule, preferably an alkene having from about 6 to about 15 carbon atoms per molecule, and an ethylenically unsaturated polar organic compound, such as an ethylenically unsaturated aliphatic acid ester, is utilized as an insecticide. It is preferred that the ethylenically unsaturated polar organic compound be present in the polymerizable composition in amounts not exceeding about 20% by weight. Of these copolymers, those having saponification values of between about 15 and about 600, especially between about 35 and about 400, have been found to be particularly suitable.

The liquid polymers employed for the purposes of the present invention generally have molecular weights of from about 250 to about 3000, and preferably from about 350 to about 750.

Unsaturated hydrocarbons which are suitable for preparing the above-described polymers include the alkenes, such as ethylene, butene-1, pentene-1, hexene-1, octene-1, dodecene-2, tetradecene-4, 2,4-decadiene, 3,6-tetradecadiene, butadiene, pentadiene, isoprene, dimethylbutadiene, octadecene-1, and the like; and the aryl-substituted alkenes, such as styrene, alpha-methylstyrene, alpha-butylstyrene, vinylnaphthalene, and the like. Commercial mixtures of alkenes, e. g., a mixture of $C_9-C_{13}$ alkenes consisting predominantly of 1-alkenes, can also be used. Preferred hydrocarbons are the alkenes containing from about 6 to about 15 carbon atoms per molecule and possessing a single ethylenic linkage generally not more than four carbon atoms removed from the end of the chain and preferably on the terminal carbon atom.

The ethylenically unsaturated polar organic compounds to be employed in the preparation of the above-described copolymers are preferably unsaturated aliphatic acid esters having at least one ethylenic group in either or both of the acid and alcohol portions of the molecule. The aliphatic acids employed in producing these esters can be monocarboxylic or polycarboxylic and can be further substituted with various substituents, such as halogen atoms, alkoxy radicals and the like. Examples of the saturated aliphatic acids that can be used in producing these esters are acetic, butyric, propionic, caproic, pelargonic, capric, lauric, cyclobutanecarboxylic, cyclopentanecarboxylic, malonic, succinic, adipic, suberic, chloroacetic, dibromocaproic, chlorosuccinic, dimethylsuccinic, and glutaric acid. The unsaturated aliphatic acids can be exemplified by acrylic, methacrylic, 2-butenoic, 2,5-heptenedioic, 3,7-dodecenedioic, maleic, fumaric, glutaconic, hydromuconic, chloroglutaconic, 5-octene-3,3,6-tricarboxylic, and 3-hexene-2,2,3,4-tetracarboxylic acid.

The alcohols employed in producing the above-described esters can be either aliphatic or aromatic and can be either monohydric or polyhydric. In addition, they can be further substituted with non-interfering substituents, such as halogen atoms, and the like. Examples of the saturated alcohols are methanol, ethanol, butanol, hexanol, decyl alcohol, isopropanol, cyclohexanol, cyclopentanol, dimethylcyclobutanol, chlorohexanol, dibromobenzyl alcohol, and the like. The unsaturated alcohols may be exemplified by allyl alcohol, vinyl alcohol, chloroallyl alcohol, 3-butenol, 2-hexenol, 2-octenol, 3-chloro-4-dodecenol and cyclohexenol.

The esters which are preferred for the production of the above-described liquid copolymers are those obtained from an aliphatic acid having not more than about 8 carbon atoms per molecule and an ethylenically unsaturated monohydric alcohol containing from 2 to 10 carbon atoms per molecule wherein at least one ethylenic linkage is preferably contained in the alpha-beta or beta-gamma positions relative to the hydroxyl group. Representative examples of the preferred esters are allyl acetate, chloroallyl acetate, allyl propionate, allyl butyrate, vinyl acetate, vinyl propionate, vinyl butyrate, and the like.

The liquid polymers employed in the practice of the present invention are not limited to those prepared by any particular method; they can be prepared by any conventional method. For example, the polymerizable composition can be heated to temperatures of up to about 250° C. in the presence of a polymerization initiator, such as ditertiary butyl peroxide or azoheptane and, if desired, a modifier such as methyl ethyl ketone. In the preparation of liquid copolymers, various mixing ratios of the ethylenically unsaturated hydrocarbon and the ethylenically unsaturated polar organic compound can be employed. It is preferred that the polymerizable mixture contain at least 80% by weight of the ethylenically unsaturated hydrocarbon and up to about 20% by weight of the ethylenically unsaturated polar organic compound. In case of the copolymers, it has been found that a pronounced relationship exists between the insecticidal action and the saponification value, that is, the content of polar groups which, in turn, is an approximate measurement of the mixing ratio of the polar compound and the hydrocarbon in the initial polymerizable mixture. The insecticidal (and ovicidal) action of the liquid copolymers has a fairly distinct maximum at the saponification value which corresponds to the mixing ratio of 10% by weight of the unsaturated polar compound and 90% by weight of the unsaturated hydrocarbon.

The above-described liquid polymers are substantially non-phytotoxic. Moreover, due to their extremely powerful insecticidal and ovicidal action, they can be used in far lower concentrations than ovicidal agents heretofore used.

The liquid polymers are useful not only in the spraying of plants in the dormant state but also for spraying fruit-bearing plants for example, for spraying citrus fruits for the control of scale insects. This is an advantage over mineral oil toxicants which often produce a substantial deterioration in the quality of the citrus fruit.

The insecticidal liquid polymers can be applied to the plants to be protected either alone or in combination with insecticidal or non-insecticidal adjuvants. The possibility of employing the liquid polymers alone makes them very suitable for low-volume spraying. Of the insecticidal adjuvants, sulfur has been found to be particularly suitable. Other insecticidal materials, such as benzene hexachloride, DDT, and the like can also be used.

Suitable non-insecticidal carriers include organic solvents, aqueous emulsions or dispersions, and solid carriers which may be either dusts or gels. Examples of suitable organic solvents are: ethyl alcohol, isopropyl alcohol, acetone, methyl ethyl ketone, ethylene glycol monoethyl ether; carbon tetrachloride, xylene, and hydrocarbon oils. Hydrocarbon oils comprise the preferred type of organic solvent. Preferably, the hydrocarbon oils are of petroleum origin and have been highly refined to remove a large proportion of the aromatic and olefinic hydrocarbons which may be present. Typical spray oils have viscosities from 30 to 100 SSU at 100° F. and preferably between 40 and 85. Petroleum oils within this viscosity range generally are referred to as kerosenes, diesel oils and gas oils and should have an unsulfonatable residue (de Ong) above about 80% and preferably above 90%. In order to insure maximum safety from phytotoxic activity, the hydrocarbon oil should contain more than about 95% unsulfonatable residue.

An especially suitable means of applying the agents of the present invention, particularly if there is danger of phytotoxic activity, is in the form of aqueous dispersions. The liquid polymers can be dispersed in water with the aid of an emulsifying agent which can be either cationic, anionic, or non-ionic. Generally, the emulsifying agent is employed in amounts of from about 1% to about 15%, and preferably from about 2% to about 8%, by weight, based on the aqueous dispersion. It is preferred to use a non-ionic surface-active agent since this makes it possible to use hard water in the preparation of the dispersion. Particularly suitable non-ionic surface-active agents are the polyethylene glycol ethers of alkyl phenols. Other non-ionic surface-active agents which can be employed are the polyalkylene glycol derivatives of fatty acid esters of polyhydric alcohols, such as sorbitan trioleate, sorbitan monooleate, sorbitan monooleate-monolaurate, sorbitan monostearate, and the like. The solubility of the emulsifying agent can frequently be increased and a good dispersion of the liquid polymers in the aqueous medium can be promoted by the addition of aliphatic or aromatic alcohols, such as isopropyl alcohol, secondary butyl alcohol, metacresol, phenol and the like. Preferably, concentrates are prepared which contain only the liquid polymer and the emulsifying agent (and, if necessary, an aliphatic or aromatic alcohol in order to promote dispersion) and which can be dispersed in locally available water shortly before use. The concentrated preparations are less expensive to transport and are more stable than the aqueous dispersions.

Generally, aqueous dispersions containing at least 50% by weight of the toxic agent, are employed.

The liquid polymers of the present invention have been found to be effective for combatting such species of insects as Tetranychidae (spider mites), for example, *Metatetranychus ulmi* Koch and *Paratetranychus citri* M. C. G.; Eriophyes, for example, *Eriophyes ribis* Nal.; Coccidae (scale insects), for example, *Aspidiotus perniciosus* Com. and *Aonidiella aurantii* Mask.; and Aphididae, for example, *Eriosoma lanigerum* Hausm. All of these pests proved to be very sensitive, even in the egg stage. It is to be understood, however, that the foregoing list is given merely by way of example and is not to be regarded as setting any limit to the usefulness of the invention.

In order to illustrate the present invention, eggs of *Metatetranychus ulmi* Koch were sprayed with the following toxic agents, which are representative of the liquid polymers of the present invention, at four different dosages of about 8, 16, 25 and 50 mgs. of the toxic agent per square centimeter:

1. A polymer obtained from a commercial mixture of octenes consisting predominantly of octene-1.
2. A polymer obtained from a commercial mixture of alkenes containing from 9 to 13 carbon atoms per molecule and consisting predominantly of alkenes-1 (this material was tested at only a single dosage).
3. Copolymers obtained from mixtures of octenes (as described in 1 above) and allyl acetate at five different mixing ratios.
4. Copolymers obtained from mixtures of alkenes (as described in 2 above) and allyl acetate at two different mixing ratios.
5. Copolymers obtained from mixtures of alkenes (as described in 2 above) and vinyl acetate at three different mixing ratios.

For purposes of comparison, spindle oil having a viscosity of 2.1 degrees Engler at 50° C. was also tested.

Each of the toxic agents of the present invention was applied alone; as an aqueous dispersion which was ready for use and which had the composition: 75% by weight of the toxic agent, 3% by weight of a polyoxyalkylene ether of sorbitan monostearate which is sold by the Atlas Powder Company under the trade name of "Tween 60," and 22% by weight of tap water from the Amsterdam water supply; and as an aqueous dispersion produced, by dilution with locally available water, from a mixture of 97% by weight of the toxic agent and 3% by weight of a non-ionic emulsifying agent consisting predominantly of polyoxyalkylene ethers of ethyl phenols and which is sold by the Rohm and Haas Co. under the trade name of "Triton X–100." No substantial differences were found in the action of the different spray liquids containing the same toxic agent. Consequently, the results given in Table I (for the liquid polymers) are the average values of the percentages of kill which were obtained with the agents at the different dosages. The results were as follows:

Table I

| Nature of Substance Investigated | Molecular Weight | Saponification Value | Quantities, in Mgs. Per Sq. Cm. Sprayed on Test Objects | | | |
|---|---|---|---|---|---|---|
| | | | 8 | 16 | 25 | 50 |
| | | | Kill in Percent | | | |
| Octene polymer | 480 | | 80 | 90 | 95 | 98.4 |
| Co-polymer of octene and allyl acetate; 5% by weight of allyl acetate in the initial mixture | 510 | 47 | 89 | 95 | 97 | 99.0 |
| Co-polymer of octene and allyl acetate; 10% by weight of allyl acetate | 560 | 90 | 90 | 97 | 98.4 | 99.6 |
| Co-polymer of octene and allyl acetate; 20% by weight of allyl acetate | 590 | 180 | 80 | 94 | 93.0 | 99.7 |
| Co-polymer of octene and allyl acetate; 30% by weight of allyl acetate | 620 | 270 | 85 | 96 | 98.5 | 99.7 |
| Co-polymer of octene and allyl acetate; 40% by weight of allyl acetate | 650 | 360 | 71 | 88 | 95.0 | 98.6 |
| $C_9$ to $C_{13}$ alkene polymer | 330 | | | | 95 | |
| Co-polymer from $C_9$ to $C_{13}$ alkene mixture and allyl acetate; 10% by weight of allyl acetate in the initial mixture | 394 | 74 | 68 | 94 | 98.6 | 99.9 |
| Co-polymer from $C_9$ to $C_{13}$ alkene mixture and allyl acetate; 20% by weight of allyl acetate | 458 | 138 | 73 | 91 | 96 | 99.1 |
| Co-polymer from $C_9$ to $C_{13}$ alkene mixture and allyl acetate; 10% by weight of vinyl acetate | 440 | 108 | 76 | 92 | 96 | 99.3 |
| Co-polymer from $C_9$ to $C_{13}$ alkene mixture and vinyl acetate; 5% by weight of vinyl acetate in the initial mixture | 412 | 39 | 76 | 92 | 97 | 99.6 |
| Co-polymer from $C_9$ to $C_{13}$ alkene mixture and vinyl acetate; 20% by weight of vinyl acetate | 412 | 155 | 59 | 87 | 96 | 99.7 |
| Spindle oil | | | 50 | 71 | 82 | 92 |

We claim as our invention:

1. A method of destroying insects which comprises contacting the insects with an effective toxic amount of a liquid copolymer which is the product of polymerization of a polymerizable composition comprising octene-1 and allyl acetate, in which composition the octene-1 is present in an amount of at least 80% by weight, said copolymer having a saponification value of from about 35 to about 400 and a molecular weight of from about 350 to about 750.

2. A method of destroying insects which comprises contacting the insects with an effective toxic amount of a liquid copolymer which is the product of polymerization of a polymerizable composition comprising a mixture of $C_9$ to $C_{13}$ alkenes consisting predominantly of 1-alkenes and allyl acetate, said alkenes being present in said composition in an amount of at least 80% by weight, said copolymer having a saponification value of from about 35 to about 400 and a molecular weight of from about 350 to about 750.

3. A method of destroying insects which comprises contacting the insects with an effective toxic amount of a liquid copolymer which is the product of polymerization of a polymerizable composition comprising a mixture of $C_9$ to $C_{13}$ alkenes consisting predominantly of 1-alkenes and vinyl acetate, said alkenes being present in said composition in an amount of at least 80% by weight, said copolymer having a saponification value of from about 35 to about 400 and a molecular weight of from about 350 to about 750.

4. A method of destroying insects which comprises contacting the insects with an effective toxic amount of a liquid copolymer which is the product of polymerization of a polymerizable composition comprising at least 80% by weight of an alkene having from about 6 to about 15 carbon atoms per molecule and not more than 20% by weight of an ester of an aliphatic acid having not more than about 8 carbon atoms and an ethylenically unsaturated monohydric aliphatic alcohol having from about 2 to about 10 carbon atoms per molecule, said copolymer having a saponification value of from about 15 to about 600 and a molecular weight of from about 250 to about 3000.

5. A composition suitable for destroying insects comprising an effective toxic amount of a liquid polymer of an alkene having not more than about 20 carbon atoms per molecule, said polymer having a molecular weight of from about 250 to about 3000, and a minor amount of a surface-active agent in an aqueous medium.

6. The composition according to claim 5, wherein said alkene contains from about 6 to about 15 carbon atoms per molecule.

7. The composition according to claim 5, wherein said liquid polymer is a liquid polymer of octene-1, said polymer having a molecular weight of from about 350 to about 750.

8. A composition suitable for destroying insects comprising an effective toxic amount of a liquid copolymer which is the product of polymerization of a polymerizable composition comprising at least 80% by weight of an alkene having from about 6 to about 15 carbon atoms per molecule and not more than about 20% by weight of an ester of an aliphatic acid having not more than about 8 carbon atoms and an ethylenically unsaturated monohydric aliphatic alcohol having from about 2 to about 10 carbon atoms per molecule, said copolymer having a saponification value of from about 35 to about 400 and a molecular weight of from about 350 to about 750, and a minor amount of non-ionic surface-active agent in an aqueous medium.

9. A method of destroying insects which comprises contacting the insects with an effective toxic amount of a liquid copolymer which is the product of polymerization of a polymerizable composition comprising an alkene having from about 8 to about 13 carbon atoms and an ester of an aliphatic acid having not more than about 8 carbon atoms and an ethylenically unsaturated monohydric aliphatic alcohol having from about 2 to about 10 carbon atoms per molecule, said copolymer having a saponification value of from about 15 to about 600 and a molecular weight of from about 250 to about 3000.

10. A method of destroying insects which comprises contacting the insects with an effective toxic amount of a liquid copolymer which is the product of polymerization of a polymerizable composition comprising octene-1 and allyl acetate, in which composition the octene-1 is present in an amount of at least 80% by weight, said copolymer having a saponification value of from about 47 to about 180 and a molecular weight of from about 510 to about 590.

11. A composition suitable for destroying insects comprising an effective toxic amount of a liquid copolymer which is the product of polymerization of a polymerizable composition comprising an alkene having from about 8 to about 13 carbon atoms and allyl acetate, said copolymer having a saponification value of from about 35 to about 400 and a molecular weight of from about 350 to about 750, and a minor amount of non-ionic surface-active agent in an aqueous medium.

12. A composition suitable for destroying insects comprising an effective toxic amount of a liquid polymer which is the product of polymerization of a polymerizable composition comprising at least 80% by weight of an alkene having not more than about 20 carbon atoms per molecule, said polymer having molecular weight of from about 250 to about 3000, and a minor amount of a non-ionic surface-active agent in an aqueous medium.

References Cited in the file of this patent

UNITED STATES PATENTS 2,551,643     Seger                May 8, 1951

OTHER REFERENCES

Roark: U. S. D. A. Tech. Bull. No. 162, pp. 4 and 5, March 1929.